United States Patent Office 3,577,382
Patented May 4, 1971

3,577,382
POLYMERIC COMPOSITIONS COMPRISING ORGANO-AMINO-PHOSPHONATE ESTERS
Al F. Kerst, Creve Coeur, Mo., assignor to Monsanto Company, St. Louis, Mo.
No Drawing. Continuation-in-part of application Ser. No. 759,250, Sept. 11, 1968. This application June 11, 1969, Ser. No. 832,441
Int. Cl. C09k 3/28
U.S. Cl. 260—45.8           13 Claims

ABSTRACT OF THE DISCLOSURE

This invention relates to polymeric compositions containing esters, salts and acids of partial anhydrides of organophosphonates which include such a compound as shown below:

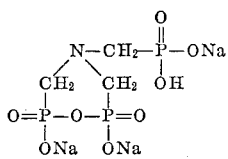

---

This is a continuation-in-part of Ser. No. 759,250 filed Sept. 11, 1968. This invention relates to organic polymeric compositions and, more particularly, provides novel polymeric compositions having increased resistance to burning and a method for rendering polymeric compositions flame retardant.

It is an object of this invention to provide new and useful polymeric compositions.

It is another object of this invention to provide methods for increasing the resistance of organic polymeric compositions to the action of flames and for making them more resistant to burning action in general.

An additional object of this invention is to provide in polymer compositions an organic phosphorus compound having reduced tendency to decompose and/or degrade from the polymer compositions when the polymer system is subjected to elevated temperatures.

Other objects, advantages, and aspects of this invention will become apparent from a reading of the specification and the appended claims.

This invention provides, as new compositions of matter, an organic synthetic polymer (linear or cross-linked) in combination with a partial anhydride of an organo-amino-polyphosphonate as defined herein.

Another aspect of this invention provides, as new compositions of matter, synthetic copolymeric materials prepared using as a comonomer a partial anhydride of an organo-amino-polyphosphonate as defined herein.

A still further aspect of this invention provides a method for reducing the tendency of organic synthetic polymers to burn after a source of burning heat has been removed from the polymeric composition by incorporating into the organic synthetic polymer compositions a partial anhydride of an organo-amino-polyphosphonate as defined herein.

The partial anhydrides of organo-amino-polyphosphonates which are added to, blended with, or co-polymerized with the synthetic polymeric materials to accomplish the above stated objects and aspects are disclosed and described as well as methods for preparing the same in co-pending application Ser. No. 832,434 of Fred A. Kerst entitled "Partial Anhydrides of Organo-Phosphonates," filed June 11, 1969, and which is incorporated herein by reference.

The organic phosphorus compounds which are useful in the present invention are partial anhydrides of organo-amino-polyphosphonates having the formula:

(I) 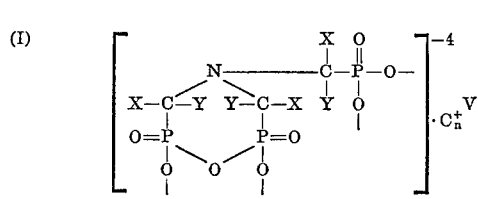

and the esters thereof hereinafter defined. In the above formula X and Y are each selected from the group consisting of hydrogen and hydrocarbyl groups containing from 1 to 6 carbon atoms. These hydrocarbyl groups are preferably alkyl groups which can be either straight chain or branched chain and may either be substituted or unsubstituted. As examples of substituents which may be utilized, there may be mentioned halides (fluoride, chloride, bromide and iodide), hydroxy, sulfonyl and the like.

In the above formula $C_n^{+V}$ generically designates cations which include metal ions (e.g. alkali metal ions— Na, K, Rb, Cs, Fr; alkaline earth metal ions—Ba, Sr, Ca, Mg; and metals such as Fe, Zn, and Mn), hydrogen ions, ammonium ions, organic ammonium ions having the formula ($-NR_4^+$) wherein R is an alkyl group containing from 1 to 6 carbon atoms or hydrogen, and combinations of said ions. It is to be understood then, that $C_n^{+V}$ can represent not only a single type cation such as hydrogen but can also represent a combination of different type cations such as hydrogen and sodium. It should be noted however, that the valence of a single type cation or the sum total of the valences of a combination of different cations have a total positive charge of 4.

Referring more specifically to V in the above Formula I, V designates the individual valence of the cations heretofore mentioned and $n$ has a total value of 1 through 4 depending upon the valence of the cation. Thus, where one desires to utilize a combination of either like or different type cations, the combinations of said cations may be expressed as

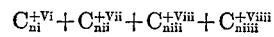

wherein

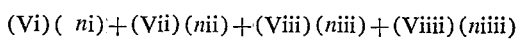

equals 4. Examples of using only one type cation and using a combination of different type cations are set forth below:

(a)   $C_n^V = H_4^{+1}$ or $H_1^{+1} + H_1^{+1} + H_1^{+1} + H_1^{+1}$ (b)   $C_n^V = Na_1^{+1} + Ca_1^{+2} + H_1^{+1}$ (c)   $C_n^V = Zr_1^{+4}$ (d)   $C_n^V = K_1^{+1} + Zn_1^{+2} + Na_1^{+1}$ (e)   $C_n^V = Na_1^{+1} + Na_1^{+1} + Na_1^{+1} + Na_1^{+1}$

It is to be understood that the compounds falling within the above Formula I include the anhydrous compound per se and hydrates thereof and also mixtures of both the anhydrous and hydrates of said partial anhydrides.

As examples of partial anhydrides falling within the above-described compound of Formula I, there may be illustrated the compounds set forth in Formulae II, III and IV as shown below:

(II) trisodium amino tri(methylene phosphonate) monoanhydride

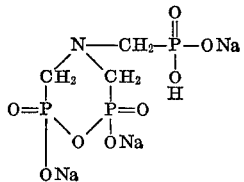

(III) amino tri(methylene phosphonic acid) monoanhydride

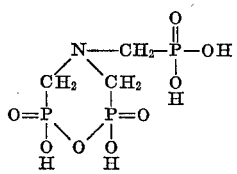

(IV) monopotassium, disodium amino tri(methylene phosphonate) monoanhydride

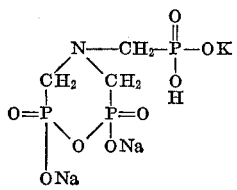

It is to be understood then that the terms "partial anhydride of organo-amino-phosphonates" and "phosphonate partial anhydride," as used herein, generically describe all of the foregoing (i.e. compounds of Formulae I, II, III and IV) compounds and esters thereof including the anhydrous forms, hydrate forms and mixtures thereof. It is to be understood that the terms "monoanhydride" and "partial anhydride" are used interchangeably herein.

In general, the partial anhydrides used in the present invention can be prepared by reacting a full or complete anhydride of organo-amino-phosphonic acid with either water, followed by an additional step hereinafter described, or with an aqueous solution of a metal hydroxide. More specifically, the starting material is a complete and full anhydride of "amino tri(lower alkylidene phosphonic acid)" is shown by the following structural formula:

(V)

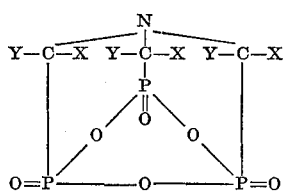

In the above Formula V, X and Y are each of the character as heretofore defined in Formula I as set forth above. The complete or full anhydride or amino tri(lower alkylidene phosphonic acid) are disclosed and described as well as methods for preparing same in copending application U.S. Serial No. 538,198 of Riyad R. Irani and Robert S. Mitchell entitled "Anhydrides of Organo-Phosphonic Acids," filed Mar. 29, 1966; and are disclosed and described in U.S. 3,395,113, both of which are incorporated herein by reference.

In conjunction with the preparation of the partial anhydrides of the present invention via hydrolysis per se to form the fully protonated partial anhydride (note Formula III), the complete anhydride is reacted with at least sufficient stoichiometric amounts of water in a reaction vessel. After the reaction has been substantially completed, the resultant reaction product is frozen, e.g. by immersing the vessel in a slurry of a mixture of Dry Ice and acetone for a sufficient period of time in order to substantially freeze the contents of the vessel. The resultant frozen mixture containing the partial anhydrides as disclosed in Formula III then undergoes a lyophilization procedure ("freeze drying") wherein dehydration is carried out by the aid of vacuum. The resultant substantially anhydrous partial anhydride (Formula III) is solid and substantially stable at room temperature.

An alternative method for preparing the fully protonated partial anhydride (as disclosed in Formula III) can be carried out whereby the complete anhydride (Formula V) is reacted with water (as heretofore mentioned in the first step of the procedure outlined above) followed by the addition of at least stoichiometric amounts of a metal hydroxide such as barium hydroxide (in water) which results in the formation of the partial anhydride containing two barium cations in the molecular structure. (This is established by the elemental analysis of the dried material and by nuclear magnetic resonance spectra, herein referred to as N.M.R. for the sake of brevity, of the $P^{31}$ and $H^1$ atoms.) The barium containing partial anhydride is separated from the reaction mixture by the addition of a water soluble organic solvent such as ethanol, followed by filtration and washed with an inert liquid, non-aqueous organic solvent such as methanol, ethanol, acetone, dimethyl formamide and the like to remove the residual water. The filter cake (the barium-partial anhydride) is then dried and subsequently slurried with an organic solvent such as ether. Substantially anhydrous $H_2SO_4$ (or any mineral acid which will form a salt precipitate with the cation of the aforementioned metal hydroxide) in an organic solvent such as ether is then reacted with the partial anhydride-ether slurry to form the fully protonated partial anhydride and a barium sulfate precipitate. A halohydrocarbon such as chloroform is added to end products to assist the separation of the anhydride from the $BaSO_4$. After stirring to insure complete reaction, the $BaSO_4$ is filtered off. The remaining solution is then subjected to rotatory evaporation which yields the fully protonated partial anhydride (Formula III).

Where one desires to prepare the partial anhydride which contains a metallic cation or cations in its molecular structure (i.e. either a partially or fully neutralized partial anhydride), the full or complete anhydride (Formula V) is reacted with an aqueous solution of a metal hydroxide (e.g. NaOH, KOH and the like or mixtures of NaOH and KOH). Generally, this reaction is carried out at room temperature; however, it is to be understood that it is within the scope of the present invention that these reactions can be carried out at any temperature above the freezing point of the reactants and below the boiling point thereof. Furthermore, these reactions can be carried out at atmospheric conditions or at sub-atmospheric or super-atmospheric conditions as long as there is substantially no adverse effect in obtaining the desired end product, i.e., the partial anhydride.

In conjunction with the amounts of the reactants which are utilized, it is to be understood that different amounts of either one reactant or the other will produce different cation-containing partial anhydrides. For example, where one desires to prepare the partially neutralized partial anhydride similar to the one shown in the above Formula II, the stoichiometric amounts utilized would be one mole of the complete anhydride of Formula V (wherein X and Y are each hydrogen) and three moles of sodium hydroxide. By the same token, where one uses one mole of the complete anhydride (Formula V) wherein X and Y are each hydrogen) and four moles of sodium hydroxide, the resultant product would be the completely neutralized partial anhydride as shown by the formula set forth below:

(VI)

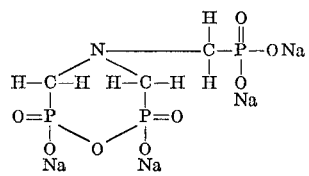

The presently provided partial anhydrides of organo-amino-phosphonates are useful as modifiers as well as flame retardants for synthetic polymeric materials. The present partial anhydrides of organo-amino-phosphonates may be used in a quantity which is equal to that of the polymer, but in most instances favorable results with respect to improvement in flame-retardance are obtained at concentrations which are definitely lower. In some cases amounts as little as 0.1%, by weight of polymer and partial anhydride, may be used, although generally it is preferred that amounts of from 1% to 50% be used to provide polymeric systems which have reduced burning rates. Use of the present partial anhydrides of organo-amino-phosphonates with the polymeric materials in quantities which confer beneficial properties to the polymers with respect to a desired effect, i.e., flame retardance, often confers to the polymer an improvement also in such characteristics as resistance to impact, dimensional stability, moldability, dye receptivity and the like. Hence in order to arrive at optimum beneficial effect suited to the purposes for which the polymeric composition is designed, only routine testing, involving variation of adjuvant quantity is generally required, although in some instances one or more members of the whole class of the presently provided partial anhydrides of organo-amino-phosphonates will be found to impart a degree of modification at a low concentration which can be attained by other members of the class at significantly higher concentrations.

The flammability test for measuring the burn qualities of polymer samples is for the most part essentially the standard burn test known as ASTM–D1692–D59T or modifications thereof. As used herein a polymeric composition is considered "non-burning" if there is no evidence of burning (flame or progressive glow) after removal of the burner and a "self-extinguishing" sample is one that continues to burn after removal of the burner but the flame goes out before the second gauge line is reached. Thus burn test, ASTM–D1692–D59T, is incorporated herein by reference.

In general, the partial anhydrides of organo-amino-phosphonates can be used as a comonomer in place of or in combination of other conventionally used dibasic or polybasic carboxylic anhydrides, such as phthalic and maleic anhydride, to form synthetic polymeric systems. The partial anhydrides, for example, can undergo reactions with reactive hydrogen-containing materials which include polyamines containing at least two amine groups with a reactive hydrogen on each group and polyhydroxyl-containing organic compounds (containing at least two hydroxyl groups with a reactive hydrogen on each group) including polyhydric alcohols, phenols and the like. A distinct advantage of the present invention, therefore, is the flexibility which the phosphonate partial anhydrides exhibit in formulating and preparing polymeric compositions. For example, they can be used with preformed monomers, copolymers and the like or they can be used as a comonomer to form polymers with other appropriate monomer materials.

In general, the polyhydric alcohols which are useful in preparing polymers by reaction with the phosphonate partial anhydrides include glycerol, pentaerythritol (including di- and tripentaerythritol), sorbitol, mannitol, and the glycols (including the alkylene glycols and the polyalkylene glycols in which the alkylene group is ($-CH_2-$)$_n$ wherein $n$ is an integer from 2 to 10), such as, ethylene glycol, propylene glycol, butylene glycol, diethylene glycol, dipropylene glycol, triethylene glycol, tetraethyene glycol, hexamethylene glycol, decamethylene glycol and the like. The reaction for preparing the polymers results in when using a polyhydric alcohol, for example,

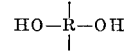

the following:

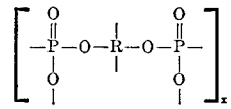

wherein R represents the hydrocarbon (including hydroxy-substituted hydrocarbon) portion of the polyhydric alcohol and X represents a recurring unit of the polymer.

In general, the polyamines which are useful in preparing polymers by reaction with the phosphonate partial anhydrides include the alkylene polyamines (particularly the alkylene diamine, triamine, and tetraamines in which the alkylene group is ($-CH_2-$)$_n$ wherein $n$ is an integer from 2 to 10) such as, ethylene diamine, diethylene diamine, hexamethylene diamine, decamethylene diamine, triethylene tetraamine, pentamethylene triamine, hexamethylene tetraamine, butylene diamine, and the like. The reaction for preparing the polymers results in when using a polyamine, for example,

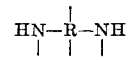

the following:

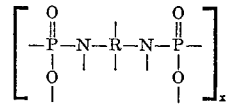

wherein R represents the hydrocarbon (including amine-substituted hydrocarbon) portion of the polyamine and X represents a recurring unit of the polymer.

Usually, all that is necessary is to mix the phosphonate partial anhydride and polyamine and/or polyhydric organic compounds preferably in amounts of about one P—O—P (phosphonate partial anhydride) group per amine or hydroxyl group, although amounts on a phosphonate partial anhydride group to amine or hydroxyl group ratio of from about 1:10 to 10:1 can be used, and heat to elevated temperatures, such as from about 40° C. to the melting point of the reactants (under atmospheric pressure, although sub-atmospheric pressures as well as pressures in excess of atmospheric can be used) with temperatures above about 90° C. being preferred. In addition, it is sometimes advantageous to employ an inert liquid non-aqueous reaction medium such as paraffin hydrocarbons, benzene, toluene, xylene, acetone, dimethyl formamide and the like and after polymerization removing the medium such as by distillation and/or decantation in order to recover the polymer.

Synthetic polymeric materials, i.e., those high molecular weight organic materials which are not found in nature, with which the present partial anhydrides of organo-amino-phosphonates are advantageously employed may be either linear or cross-linked polymers and they may be either those which are produced by addition polymerization or by condensation.

An important class of polymers which are beneficially modified according to the invention are those obtained from a polymerizable monomer compound having ethylenic unsaturation.

A particularly preferred class of polymers flame-proofed hereby consists of the polymerized vinyl and vinylidene compounds, i.e., those having the $CH_2=C<$ radical. Compounds having such a radical are, e.g., the solid polymeric alkenes, such as polyethylene, polypropylene, polyisobutylene or ethylene-propylene copolymer; polymerized acrylyl and alkacrylyl compounds such as acrylic, chloroacrylic and methacrylic acids, anhydrides, esters, nitriles and amides, for example, acrylonitrile, ethyl or butyl acrylate, methyl or ethyl methacrylate, methoxymethyl or 2-(2-butoxyethoxy) ethyl methacrylate, 2-(cyano-ethoxy) ethyl 3-(3-cyanopropoxy)propyl acrylate or methacrylate, 2-(diethylamino) ethyl or 2-chloroethyl acrylate or methacrylate, acrylic anhydride or methacrylic anhydride; methacrylamide or chloroacrylamine, ethyl or butyl chloroacrylate; the olefinic aldehydes such as acrolein, methacrolein and their acetals; the vinyl and vinylidene halides such as vinyl chloride, vinyl fluoride, vinylidene fluoride and 1-chloro-1-fluorethylene; polyvinyl alcohol; the vinyl carboxylates such as vinyl acetate, vinyl chloroacetate, vinyl propionate, and vinyl 2-ethyl-hexanoate; the N-vinylimides such as N-vinylphthalimide and N-vinyl-succinimide; the N-vinyllactams such as N-vinylcaprolactam and N-vinylbutyrolactam; the vinyl aromatic hydrocarbon compounds such as styrene, α-methylstyrene, 2,4-dichlorostyrene, α- or β-vinylnaphthalene, divinylbenzene and vinylfluorene; the vinyl ethers such as ethyl vinyl ether or isobutyl vinyl ether; vinyl-substituted heterocyclic compounds such as vinylpyridine, vinylpyrrolidone, vinylfuran or vinylthiophene; the vinyl or vinylidene ketones such as methyl vinyl ketone or isopropenyl ethyl ketone; vinylidene cyanide; etc. Homopolymers of the above compounds or copolymers or terpolymers thereof are beneficially modified by the present phosphonate partial anhydrides. Examples of such copolymers or terpolymers are those obtained by polymerization of the following monomer mixtures: vinyl chlorine-vinyl acetate, acrylonitrile-vinyl pyridine, styrene-methyl methacrylate; styrene-N-vinyl-pyrrolidone, cyclohexyl methacrylate-vinyl chloroacetate, acrylonitrile-vinylidene cyanide, methyl methacrylate-vinyl acetate, ethyl acrylate-methacrylamide-ethyl chloroacrylate, vinyl chloride-vinylidene chloride-vinyl acetate, etc.

Other presently employed polymers of compounds having the ethylenic group, $>C=C<$, are the homopolymers, copolymers and terpolymers of the α,β-olefinic dicarboxylic acids and the derivatives thereof such as the anhydrides, esters, amides, nitriles and imides, e.g., methyl, butyl, 2-ethylhexyl or dodecyl fumarate or maleate, maleic, chloromaleic, citraconic or itaconic anhydride, fumaronitrile, dichlorofumaronitrile or citraconontrile, fumaramide, or maleamide; maleimide or N-phenylmaleimide, etc. Examples of particularly useful copolymers and terpolymers prepared from the α,β-olefinic dicarboxy compounds are the copolymers of maleic anhydride and a vinyl compound such as ethylene, propylene, isobutylene, styrene, α-methylstyrene, vinyl acetate, vinyl propionate, methyl isopropenyl ketone, isobutyl vinyl ether, etc., the copolymers of dialkyl fumarate such as ethyl or butyl fumarate and a vinyl compound such as styrene, vinyl acetate, vinylidene chloride, ethyl methacrylate, acrylonitrile, etc.

Readily and advantageously modified by the present phosphonate partial anhydrides are also the polymers and copolymers of unsaturated, cyclic esters of carbonic acid, e.g., homopolymeric vinylene carbonate or the copolymers of vinylene carbonate with ethylenic compounds such as ethylene, vinyl chloride, vinyl acetate, 1,3-butadiene, acrylonitrile, methacrylonitrile, or the esters of methacrylic or acrylic acid.

Readily and advantageously modified by the present phosphonate partial anhydrides are also the polyarylcarbonate polymers such as the linear polyarylcarbonates formed from diphenols or dihydroxy aromatic compounds including single and fused-ring nuclei with two hydroxy groups as well as monohydroxy-substituted aromatic residues joined in pairs by various connecting linkages. Examples of the foregoing include dihydroxybenzenes, naphthalenes and the like, the dihydroxydiphenyl ethers, sulfones, alkanes, [bis(4-hydroxyphenyl)2,2-propane], ketones and the like.

Advantageously modified by the present phosphonate partial anhydrides are also polymers, copolymers or terpolymers or polymerizable compounds having a plurality of double bonds, e.g., a rubbery, conjugated diene polymerizate such as homopolymerized 2,3-butadiene, 2-chlorobutadiene or isoprene and linear copolymers or terpolymers such as butadiene-acrylonitrile copolymer, isobutylene-butadiene copolymer (butyl rubber) butadiene-styrene copolymer of 2-chloro-butadiene-vinylidene cyanide-acrylonitrile terpolymer; esters of saturated di- or polyhydroxy compounds with olefinic carboxylic acids such as ethylene glycol dimethacrylate, triethylene glycol dicrotonate or glyceryl tri-acrylate; esters of olefinic alcohols with dicarboxylic acids or with olefinic monocarboxylic acids such as diallyl adipate, divinyl succinate, diallyl fumarate, allyl methacrylate or crotyl acrylate and other diethylenically unsaturated compounds such as diallyl carbonate, divinyl ether or divinylbenzene, as well as the cross-linked polymeric materials such as methyl methacrylate-diallyl methacrylate copolymer or butadiene-styrene-divinylbenzene terpolymer.

Polymerized materials prepared by subsequent reaction of the preformed vinyl polymers, e.g., polyvinyl alcohol, the polyvinyl acetals such as polyvinyl formal or polyvinyl butyral, or completely or partially hydrolyzed polyacrylonitrile are likewise modified in properties by the present phosphonic anhydrides to give polymeric materials of enhanced utility.

Polymeric materials with which the present phosphonate partial anhydrides can be employed as adjuvants are also polymers which contain elements such as sulfur, phosphorus, boron or silicon, e.g., the sulfides, sulfones, sulfoxides, sulfites, sulfates and sulfonates such as the polymers and copolymers of vinyl sulfide, vinyl sulfone, 2-propenyl sulfoxide, ethylene sulfonic acid and its salts, esters and amides, and sulfonated polystyrene; the olefin-sulfur dioxide polymers, the phosphines, phosphites, phosphates and phosphonates such as diphenylvinylphosphine, allyl phosphite and methallyl phosphite, ethylene phosphonic acid and styrenephosphonic acid and their salts, esters and amides; the silanes such as dimethylvinylsilane, diphenylvinylsilane and methylphenylvinylsilane, etc.

A class of synthetic polymeric materials with which the present phosphonate partial anhydrides are very useful comprises the cellulose derivatives, e.g., the cellulose esters such as cellulose acetate, cellulose triacetate, or cellulose acetate butyrate, the cellulose ethers such as methyl or ethyl cellulose, cellulose nitrate, carboxymethyl cellulose, cellophane, rayon, regenerated rayon, etc. The phosphonate partial anhydrides may be incorporated into films of such cellulose derivatives by adding them to the solutions from which the films are cast or into the melts from which the fibers are extruded.

The present phosphonate partial anhydrides are particularly suited to the modification of liquid resin compositions of the polyester type, e.g., the linear polyesters which are obtained by the reaction of one or more polyhydric alcohols with one or more α,β-unsaturated polycarboxylic acids alone or in combination with one or more saturated polycarboxylic acid compounds, or the cross-linked polyester resins which are obtained by reacting the linear polyester with a compound containing a $C_2=C<$ group.

The cross-linking components of the presently modified polyester resin may be, e.g., styrene, the nuclear or side-chained substituted styrenes such as 3,4-dichlorostyrene, α-chloro-styrene, α-methylstyrene; other vinyl-substituted hydrocarbons such as α- or β-vinylnaphthalene or 4-vinylbiphenyl; the olefinic carboxylic acids and the esters, nitriles, amides and anhydrides thereof such as acrylic acid, methacrylic acid, ethyl acrylate, or acrylonitrile; the vinyl esters such as vinyl acetate or vinyl chloroacetate; the olefinic ketones such as ethyl vinyl ketone and isopropenyl methyl ketones; the alkenes such as isobutylene and 2-pentene; the olefinic ethers such as vinyl ethyl ether and vinyl isobutylether; etc.

The epoxy resins are another class of polymeric materials with which the present phosphonate partial anhydrides are compatible and are advantageously used. These resins are condensation products formed by the reaction of a polyhydroxy compound and epichlorohydrin, which condensation products are subsequently cured by addition of cross-linking agents. The hydroxy compound may be e.g., ethylene glycol, 4,4'-isopropylidenediphenol, etc. The cross-linking agent employed in the curing or hardening step may be a dicarboxylic compound such as phthalic anhydride or adipic acid, but is more generally a polyamine such as ethylene diamine, m- or p-phenylene diamine or diethylenetriamine.

The polyurethanes comprise another class of polymeric materials which are beneficially modified by the present phosphonate partial anhydrides. The polyurethanes, like the above-mentioned polyesters, are commercial materials which are employed in structural applications, e.g., as insulating foams, in the manufacture of textile fibers, as resin bases in the manufacture of curable coating compositions and as impregnating adhesives in the fabrication of laminates of woods and other fibrous materials. Essentially the polyurethanes are condensation products of a diisocyanate and a compound having a molecular weight of at least 500 and preferably about 1500–5000, and at least two reactive hydrogen atoms, i.e., hydrogen atoms determinable by the Zerewitinoff method. The useful active-hydrogen containing compounds may be polyesters prepared from polycarboxylic acids and polyhydric alcohols, polyhydric polyalkylene ethers having at least 2 hydroxy groups, polythioether glycols, polyesteramides, etc.

The polyesters or polyesteramides used for the production of the polyurethane may be branched and/or linear, e.g., the esters of adipic, sebacic, 6-aminocaproic, phthalic, isophthalic, terephthalic, oxalic, malonic, succinic, maleic, cyclohexane - 1,2 - dicarboxylic, cyclohexane-1,4-dicarboxylic, polyacrylic, naphthalene-1,2-dicarboxylic, fumaric, itaconic, etc., with polyalcohols such as ethylene glycol, diethylene glycol, pentaglycol, glycerol, sorbitol, triethanolamine, di-($\beta$-hydroxyethyl) ether, etc. and/or amino-alcohols such as ethanolamine, 3-aminopropanol, 4-aminopropanol, 5 - aminopentanol-1, 6-aminohexanol, 10-aminodecanol, 6-amino - 5 - methylhexanol-1, p-hydroxymethylbenzylamine, etc.; and with mixtures of the above polyalcohols and amines, ethylene diamine, hexamethylene diamine, 3-methylhexamethylene diamine, decamethylene diamine and m-phenylenediamine, etc. and/or amino-alcohols, etc. In the esterification, the acid per se may be used for condensation or, where desirable, equivalent components such as the acid halide or anhydride may be used.

The alkylene glycols and polyoxyalkylene or polythioalkylene glycols used for the production of the polyurethanes may comprise ethylene glycol, propylene glycol, butylene glycol-2,3, butylene glycol-1,3,2-methylpentanediol-2,4,2-ethylhexanediol - 1,3 - hexamethylene glycol, styrene glycol and decamethylene glycol, etc., and diethylene glycol, triethylene glycol, tetraethylene glycol, polythioethylene glyocl, polyethylene glycols 200, 400 and 600 etc., dipropylene glycol, tripropylene glycol, trithiopropylene glycol, polypropylene glycols 400, 750, 1,200 and 2,000 etc.

Broadly, any of the polyesters, polyisocyanate-modified polyesters, polyesteramides, polyisocyanate-modified polyesteramides, alkylene glycols, polyisocyanate-modified alkylene glycols, polyoxyalkylene glycols and polyisocyanate-modified polyoxyalkylene glycols, etc. having free reactive hydrogen atoms, free reactive carboxylic and/or especially hydroxyl groups may be employed for the production of the polyurethanes. Moreover, any organic compound containing at least two radicals selected from the class consisting of hydroxyl and carboxyl groups may be employed.

The organic polyisocyanates useful for the production of the polyurethanes include ethylene diisocyanate, ethylidene diisocyanate, propylene-1,2-diisocyanate, butylene-1, 3-diisocyanate, hexylene-1,6-diisocyanate, cyclohexylene-1,2-disocyanate, m-phenylene diisocyanate, 2,4-toluylene diisocyanate, 2,6-toluylene diisocyanate, 3,3'-dimethyl-4,4' - biphenylene diisocyanate, 3,3'-dimethoxy-4,4'-biphenylene diisocyanate, 3,3'-diphenyl - 4,4' - biphenylene diisocyanate, 4,4'-biphenylene diisocyanate, 3,3'-dichloro-4,4'-biphenylene diisocyanate, triphenylmethane triisocyanate, 1,5-naphthalene diisocyanate or polyisocyanates in a blocked or inactive form such as the bisphenyl carbamates of toluylene diisocyanate, p, p,'-diphenylmethane diisocyanate, p-phenylene diisocyanate and 1,5-naphthalene diisocyanate, etc.

For preparation of the flame-retardant polyurethanes, the present phosphonate partial anhydrides are preferably added to a mixture of the reactants and catalyst before hardening. The hardened molded pieces or foams are rendered flame-retardant by the inclusion therein of the phosphonate partial anhydride in quantities of from about 2% to 25% by weight of the polyurethane. Use of the present phosphonate partial anhydrides in the polyurethane foams can also, in some applications, improve the mechanical properties of the foams.

Phenolic resins are also beneficially modified by the present phosphonate partial anhydrides, which compounds can be incorporated into the resin either by milling in molding applications or by addition to film-forming or impregnating and bonding solutions previous to casting. Phenolic resins with which the present compounds are employed are, for example, the phenolaldehyde resins prepared from phenols such as phenol, cresol, xylenol, resorcinol, 4-butylphenol, 4-phenylphenol, and aldehydes such as formaldehyde, acetaldehyde, or butyraldehyde in the presence of either acidic or basic catalysts, depending upon whether the resin is intended for use as a molding or extruding resin or as in the resin base in coating and impregnating compositions.

The aminoplasts comprise another group of aldehyde resins which are beneficially modified by the present phosphonate partial anhydrides. Examples thereof are the heat-convertible condensation products of an aldehyde with urea, thiourea, guanidine, cyanamide, dicyandiamide, alkyl or aryl guanamines, and the triazines such as melamine, 2-chloro-4,6-diamino-1,3,5-triazine and 2-hydroxy-4,6-diamino-1,3,5-triazines. The present adjuvants are compatible with the aminoplasts; and depending upon the quantity of phosphonate partial anhydride used, they serve to modify their physical properties as well as to render them fire-retardant. When the aminoplasts are destined for use as impregnating agents, bonding adhesives, coatings and casting of films, the phosphonate partial anhydrides are incorporated into solutions or suspensions in which the aminoplast is carried. The resulting mixtures give strong, fire-retardant laminates when sheets of paper, glass, cloth or fabric are impregnated therewith and cured.

Also beneficially modified by the present phosphonate partial anhydrides are the nylons, i.e., the superpolyamides which are generally obtained by the condensation of a diamine, e.g., hexamethylenediamine with a dicarboxylic acid, e.g., adipic acid. Depending upon the quantity of phosphonate partial anhydride employed and the individual nature of the compound, there are obtained flame-retardant and/or dye receptor effects.

Other polyamides with which the present phosphonate partial anhydrides are beneficially employed, e.g., for improvement in reduced burning rates, are the polypeptides which may be prepared, e.g., by reaction of N-carbobenzyl oxyglycin with glycine or a mixture of glycine and lysine, or an N-carboxy amino acid anhydride such as N-carboxy-DL-phenyl-alanine anhydride; the polymeric lactams, e.g., polycaprolactam, piperidone, 2-oxohexamethyleneimine and other cyclic amides. The present phosphonate partial anhydrides can be incorporated into molding or extruding compositions for flame-retardant effect and/or to modify the physical properties of such compositions.

The present phosphonate partial anhydrides are also advantageously employed as adjuvants for polymeric aldehydes, e.g., homopolymeric, high-molecular weight formaldehyde.

The present phosphonate partial anhydrides are also adjuvants for linear polymers obtained by the self-condensation of bifunctional compounds generally, e.g., the polyethers which are derived by the self-condensation of dihydric alcohols such as ethylene glycol, propylene glycol or hexamethylene glycol; the polyesters which are obtained by the self-condensation of hydroxy acids such as lactic acid or 4-hydroxybutyric acid, the polyamides which are prepared by the self-condensation of amino carboxylic acids such as 4-aminobutyric acid or 6-aminocaproic acid; the polyanhydrides which are formed by the self-condensation of dicarboxylic acids such as sebacic acid or adipic acid, etc. The present phosphonate partial anhydrides are flame-retardants for such self-condensation products, generally; and where transparentizing effect and dye receptivity are lacking, the phosphonate partial anhydrides are often instrumental in ameliorating such deficiencies.

The following examples are presented to illustrate the invention, with parts and percentages by weight being used in the examples unless otherwise indicated. All polymeric compositions illustrated in the following examples will exhibit reduced burning rates and can be classified as either nonburning or self-extinguishing.

EXAMPLE I

A copolymeric composition is obtained by heating about 0.15 mol of ethylene diamine and about 0.5 mol of amino tri(methylenephosphonic acid) mono anhydride—i.e., the compound of Formula III in benzene to about 80° C. for about 4 hours. The reaction batch is cooled to room temperature and the benzene distilled off yielding a polymeric composition which softens at about 250–280° C.

EXAMPLE II

A copolymeric composition is also obtained by blending about 0.3 mol of hexamethylene diamine and about 0.1 mol of an indicated phosphonate partial anhydride compound, and heating the mixture for 3 hours at about 150° C. and thereafter cooling to room temperature. The added phosphonate partial anhydride compounds are:

(1) amino tri(methylenephosphonic acid) monoanhydride—Formula III
(2) trisodium amino tri(methylenephosphonate) monoanhydride—Formula II
(3) tetrasodium amino tri(methylenephosphonate) monoanhydride
(4) monopotassium, disodium amino tri(methylene phosphonate) monoanhydride—Formula IV
(5) monozinc, disodium amino tri(methylenephosphonate) monoanhydride.

EXAMPLE III

A copolymeric composition is also obtained by blending about 0.3 mol of ethylene glycol and about 0.1 mol of an indicated phosphonate partial anhydride compound and then heating the mixture at 90° C. for about 1 hour. Upon cooling to room temperature the composition sets to a solid polymeric composition. The added phosphonate partial anhydride compounds are the same as the five listed partial anhydrides of Example II above.

EXAMPLE IV

A copolymeric composition is obtained by dissolving about 4.7 parts of amino tri(methylenephosphonic acid) mono anhydride in about 110 parts of dimethyl formamide at a reflux temperature of about 125° C., and adding about 3.5 parts of hexamethylene diamine to the solution under refluxing. The polymeric composition precipitates from the solution in the form of a solid material and after cooling to room temperature is removed from the dimethyl formamide solution.

EXAMPLE V

A polymeric composition is obtained by blending 41 parts of oleic acid, 21 parts of glycerine, 17 parts of an indicated phosphonate partial anhydride compound, and a trace of toluene sulfonic acid and heating the mixture to about 140° C. under a flowing nitrogen blanket sufficient to exclude air and to remove by-product water. After about 30 minutes gelatin occurs and the batch is cooled to room temperature to yield a solid polymeric composition. The added phosphonate monoanhydride compounds are the same as the partial anhydrides listed as numbers 1, 2 and 5 in Example II.

EXAMPLE VI

This example illustrates the preparation of a rigid polyurethane foam using one of the indicated phosphonate partial anhydrides therein as the flame-retardant.

| Ingredient: | Parts |
|---|---|
| Methyl glucoside based polyol | 100.0 |
| Trichloromonofluoromethane | 35.0 |
| "Silicone Y–4316" [1] | 2.0 |
| Tetramethylbutane diamine | 1.5 |
| Phosphonate partial anhydride [2] | 10.0 |
| Polyisocyanate "Mondur MR" [3] | 108.0 |

[1] "Silicone Y-4316" is a trademark name for a silicon foam stabilizer sold by Union Carbide.
[2] Phosphonate partial anhydride:
    (1) amino tri(methylenephosphonic acid) monoanhydride
    (2) tetrasodium amino tri(methylenephosphonate) monoanhydride
    (3) monomagnesium, disodium amino tri(methylenephosphonate) monoanhydride
[3] Polyisocyanate "Mondur MR"—a polymethylene polyphenylisocyanate having an available NCO content of about 32% and a viscosity at 25° C. of 200±50 cps.

For the above formulation, all of the components except the polyisocyanate are blended to a homogeneous mixture, and then the polyisocyanate is added, the mixture blended thoroughly, and then is allowed to polymerize and rise.

EXAMPLE VII

A composition is also obtained by adding one of the indicated phosphonate partial anhydride compounds in a amount sufficient to be about 10% by weight based on the weight of the total solids content of a 10% benzene solution of a 72:28 molar ratio styrene-acrylonitrile copolymer. The benzene is distilled off yielding a polymeric composition. The added phosphonate partial anhydride compounds are:

(1) amino tri(methylenephosphonic acid) monoanhydride
(2) monoferrous amino tri(methylenephosphonate) monoanhydride (valence +3)
(3) monomanganese amino tri(methylenephosphonate) monoanhydride

EXAMPLE VIII

To a polymer blend of an unsaturated polyester prepared by condensing one mol of an indicated phosphonate partial anhydride, ½ mol of maleic anhydride, ½ mol of phthalic anhydride and 2.1 mols of propylene glycol in an acid number of about 40 at 200° C., cooling the mixture and dissolving the mixture in a sufficient amount of styrene monomer so that the resulting mixture comprises 30 parts styrene monomer to 70 parts of polyester. There is added a small amount (3% w./w.) of benzoyl peroxide and the resulting mixture is polymerized at 80°

C. yielding a thermosetting resin. The added phosphonate partial anhydride compounds are:

(1) amino tri(methylenephosphonic acid) monoanhydride
(2) tetrasodium amino tri(butylenephosphonate) monoanhydride
(3) dicalcium amino tri(methylenephosphonate) monoanhydride

EXAMPLE IX

To a granular blend of a polystyrene and butadiene-styrene copolymer containing about 6% by weight of the copolymer there is added one of the indicated phosphonate partial anhydride compounds in an amount of about 4% by weight by blending for 15 minutes in a tumbling type laboratory blender and then extruding the blend into rods. The added phosphonic anhydride compounds are:

(1) amino tri(methylenephosphonic acid) monoanhydride
(2) trisodium amino tri(methylenephosphonate) monoanhydride

EXAMPLE X

To melted samples of a natural high molecular weight low density polyethylene having a density of about 0.9, a melt index of about 0.3 gm./10 min., a softening temperature of about 105° C., and a tensile strength (ultimate) of 2300 p.s.i.g., various amounts of one of the indicated phosphonate partial anhydrides sufficient to make compositions wherein the added anhydride comprises from about 4 to 8% of the total weight of the composition are added. The samples are cooled to room temperature to provide polymer compositions. The added phosphonate partial anhydride compounds are:

(1) amino tri(methylenephosphonic acid) monoanhydride
(2) monocalcium, disodium amino tri(propylenephosphonate) monoanhydride
(3) trisodium amino tri(ethylenephosphonate) monoanhydride

EXAMPLE XI

To a 5% solution of a polyvinyl formal in ethylene dichloride there is added one of the indicated phosphonate partial anhydride compounds in a quantity which is about 20% by weight of the total solids content of the solution. Films are cast from such solutions and then air dried for about 24 hours. The added phosphonate partial compounds are:

(1) amino tri(methylenephosphonic acid) monoanhydride
(2) trisodium amino tri(methylenephosphonate) monoanhydride

EXAMPLE XII

Improved films are also obtained when one of the indicated phosphonate partial anhydride compounds is added to a 10% solution of a 50:50 molar ratio styrene-methyl methacrylate copolymer in benzene in an amount sufficient to be about 30% by weight of the total solids content and then cast into films which are flexible. The added phosphonate partial anhydride compounds are:

(1) amino tri(methylenephosphonic acid) monoanhydride
(2) monopotassium, disodium amino tri(methylenephosphonate) monoanhydride

EXAMPLE XIII

With about 3 parts of a commercially available condensation product of linoleic acid and a polyamine having an amine value of from 290–320 and a viscosity of 80–120 poises at 40° C., there is mixed 7 parts of diglycidyl ether of Bisphenol A and a sufficient amount of one of the indicated phosphonate partial anhydrides to make a composition having about 16% by weight, based on the weight of the total composition, of the phosphonate partial anhydride. The resulting reaction mixture is poured into a small aluminum pan (coated with a silicone grease to prevent sticking) and heated in an oven at 100° C. for about 2 hours. After cooling to room temperature an epoxy resinous product is obtained. The added phosphonate partial anhydride compounds are:

(1) amino tri(methylenephosphonic acid) monoanhydride
(2) monozinc amino tri(methylenephosphonate) monoanhydride
(3) trisodium amino tri(ethylenephosphonate) monoanhydride

EXAMPLE XIV

To samples of a commercial cellulose acetate butyrate having an average acyl content of 13% and 37% butyryl and a viscosity range of 17–33 seconds (64–124 poises) as determined by ASTM method D–1343–54T in the solution described as Formula A, ASTM method D–871–54T are blended on hot mill rolls a sufficient amount of one of the indicated phosphonate partial anhydrides such that the final compositions contain from about 10 to 15% by weight of the added phosphonate partial anhydrides. After blending the samples are cooled to room temperature to obtain a polymeric composition. The added phosphonate partial anhydrides are:

(1) amino tri(methylenephosphonic acid) monoanhydride
(2) monoferric amino tri(methylenephosphonate) monoanhydride
(3) dibarium amino tri(methylenephosphonate) monoanhydride

EXAMPLE XV

To a 10% ethylene dichloride solution of polyvinyl acetate there is added one of the indicated phosphonate partial anhydride compounds in a quantity which is ½ by weight to that of the polyvinyl acetate present in the solution. Films cast from the resulting mixture are flexible. The added phosphonate partial anhydride compounds are the same as the five listed partial anhydrides of Example II.

EXAMPLE XVI

To melted samples of a commercial rigid polymethyl methacrylate polymer there is blended on hot mill rolls one of the indicated phosphonate partial anhydrides in an amount sufficient to provide about 20% of the partial anhydride per total weight of the composition. The samples are milled into sheets in order to obtain polymeric compositions. The added phosphonate partial anhydrides are the same as the same as the five listed partial anhydrides of Example II.

EXAMPLE XVII

To 100 parts of a polyvinyl chloride resin there is added 50 parts of dioctyl phthalate and 50 parts of amino tri-(methylenephosphonic acid) monoanhydride. The mixture is placed on hot mill rolls and blended. When thoroughly blended, the product is tripped from the rolls and pressed into square shaped pieces which are soft pliable plastic.

EXAMPLE XVIII

A salt is prepared from hexamethylene diamine and adipic acid by mixing about 144 parts of amine with about 150 parts of the acid in the presence of 1300 parts of 95% ethyl alcohol and 210 parts of water. The mass is warmed until complete solution occurs and then cooled to obtain crystals of hexamethylene diammonium adipate. To this salt is added about 16 parts of amino tri(methylene phosphonic acid) monoanhydride and the mixture heated for about three hours with an equal weight of mixed xylenols (B.P. 218–222° C.) and the entire reaction mass is then poured gradually with stirring into a large volume of ethyl alcohol. The modified polyamide precipitates as a granular powder and is filtered, washed with alcohol and dried.

EXAMPLE XIX

The various organic compositions prepared in the aforegoing Examples I through XVIII and which contain the novel partial anhydrides are each individually subjected to the burn test, ASTM–D1692–D59T, heretofore described. In all cases, the organic compositions are found to either demonstrate no evidence of burning or to be "self-extinguishing." The same organic compositions which do not contain the partial anhydrides are utilized as the control materials and are tested in the same manner. These "control materials" are found in all cases to either burn or go beyond the "second gauge line," i.e. they do not exhibit "self-extinguishing" characteristics as defined by said test. Thus the utility of the present invention compositions is vividly demonstrated.

It is also within the scope of the present invention to include the esters of the partial anhydrides of the organo-amino-phosphonates and which esters have the formula:

(VI)

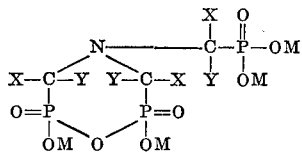

wherein M is either $C_n^{+V}$, a cation, or an organic radical, R, from the group alkyl, alkenyl, aryl, alkyl aryl, cyclic and alicyclic, where R contains from 1 to about 30 carbon atoms. It is to be understood that at least one "M" in the above Formula VI must be "R" in order to have the ester. Since at least one M in Formula VI above is "R," the $C_n^{+V}$ is defined whereby $n$ is an integer of 0 to 3 and the valance, V, of a single cation or the sum total of the valances of a combination of different cations have a total positive charge of 3 or less.

With reference to the substitutents listed for the organic radical "R" above, the preferred substituents are the following:

(a) alkyl—containing from about 1 to about 18 carbon atoms;
(b) alkenyl—containing from about 2 to about 18 carbon atoms;
(c) aryl—phenyl, naphthyl, anthryl, or phenanthryl;
(d) alkyl aryl—hydroxy, halogen, lower alkyl, having (alkaryl) from 1 to about 6 carbon atoms, and amino substituted phenyl naphthyl, anthryl, or phenanthryl;
(e) cyclic—containing from about 4 to about 8 carbon atoms and there may be present in the ring either a nitrogen, sulfur, oxygen or phosphorus atom; and
(f) alicyclic—containing from about 4 to about 10 carbon atoms.

As examples of esters of the partial anhydrides falling within the above-described compound of Formula VI, there may be illustrated the compounds set forth in Formulae VII, VIII, IX and X as shown below:

(VII) triethyl amino tri(methylene phosphonate) monoanhydride

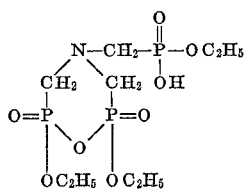

(VIII) diphenyl, monosodium amino tri(methylene phosphonate) monoanhydride

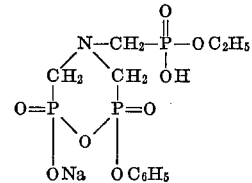

(IX) pyridyl, trisodium amino tri(methylene phosphonate) monoanhydride

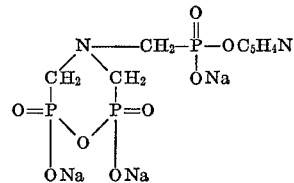

(X) chlorophenyl, monopotassium, monosodium amino tri(methylene phosphonate) monoanhydride

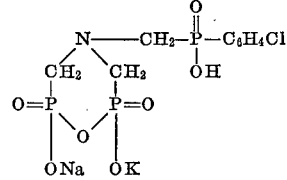

The esters of the partial anhydrides of the organoaminophosphonate can generally be prepared by reacting the full or complete anhydride, heretofore described, with a cation, $C_n^V$, containing material and an anion, $^-OR$ (R is the above described organic radical) containing material in an inert solvent. For example, the compound shown in Formula VII above can be prepared by reacting the full anhydride with ethanol in pyridine and then quenching with a dilute base, for example 10% NaOH solution, after 5 minutes at 25° C.

These esters are effective fire retardants as measured by a standard burn test, ASTM–D1692–D59T.

What is claimed is:
1. An organic composition comprising an organic synthetic polymer and at least a fire resistance imparting amount of a partial anhydride selected from the group consisting of (1) an organo-amino-phosphonate having the formula:

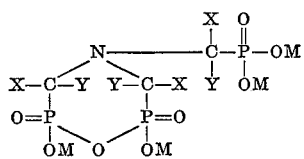

wherein X and Y are each selected from the group consisting of hydrogen and hydrocarbyl groups containing from 1 to 6 carbon atoms; M is selected from the group consisting of $C_n^{+V}$ and an organic radical selected from the group consisting of alkyl, alkenyl, aryl, alkyl aryl, cyclic groups and mixtures thereof; $C_n^{+V}$ is selected from the group consisting of metal ions, hydrogen ions, ammonium ions, organic ammonium ions having the formula $(NR_4^+)$ wherein R is an alkyl group containing from 1 to 6 carbon atoms or hydrogen, and combinations of said ions; V is the individual valence of said ions; and $n$ is the total number of ions and has a value of 0 through 3 depending upon the valance of the cation; the combination of either like or different ions having a sum total positive charge of 3 or less; (2) hydrates of said phosphonate; and (3) mixtures thereof; with the proviso that in all cases, at least one "M" is an organic radical, as defined.

2. The composition as set forth in claim 1, wherein X and Y are each hydrogen.

3. The composition as set forth in claim 2, wherein said organic radical is an alkyl group containing from 1 to 18 carbon atoms.

4. The composition as set forth in claim 1 wherein said organic radical is ethyl.

5. The composition as set forth in claim 1, wherein X, Y are each hydrogen and said organic radical is an alkenyl group containing from 2 to 18 carbon atoms.

6. The composition as set forth in claim 1, wherein the polymer is polyurethane.

7. The composition as set forth in claim 1, wherein the polymer is a polyester polymer.

8. An organic composition comprising an organic synthetic polymer and at least a fire resistance imparting amount of a partial anhydride of an organo-amino-phosphonate having the formula:

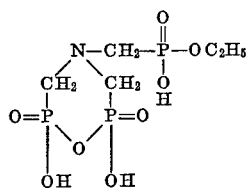

9. An organic composition comprising an organic synthetic polymer and at least a fire resistance imparting amount of a partial anhydride of an organo-amino-phosphonate having the formula:

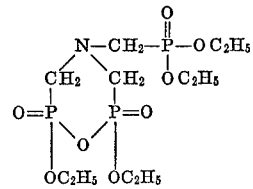

10. The composition as set forth in claim 9 wherein said polymer is polyurethane.

11. The composition according to claim 9, wherein said polymer is a polyester polymer.

12. The composition according to claim 1, wherein said polymer is a polyamide which is characterized by having recurring carbonamide groups as integral parts of the main polymer chain.

13. The composition according to claim 1, wherein said polymer is polystyrene.

References Cited

UNITED STATES PATENTS

| | | | |
|---|---|---|---|
| 3,437,607 | 4/1969 | Nashu et al. | 260—2.5 |
| 3,440,222 | 4/1969 | Walsh et al. | 260—75 |

DONALD E. CZAJA, Primary Examiner

R. A. WHITE, Assistant Examiner

U.S. Cl. X.R.

106—177; 260—2.5, 45.9, 77.5, 78, 93.5, 864